United States Patent Office 3,566,258
Patented Feb. 23, 1971

3,566,258
EDDY CURRENT FLAW DETECTOR HAVING AUTOMATICALLY BALANCING BRIDGE CIRCUIT
Toshihiro Mori and Seigo Ando, Kawasaki-shi, Japan, assignors to Nippon Kokan Kabushiki Kaisha
Filed Mar. 22, 1968, Ser. No. 715,442
Claims priority, application Japan, Mar. 23, 1967, 42/17,708; Oct. 27, 1967, 42/68,825
Int. Cl. G01r 33/12
U.S. Cl. 324—40                                    6 Claims

ABSTRACT OF THE DISCLOSURE

In an eddy current flaw detector utilizing a bridge circuit, a variable voltage source is included in one arm of the bridge and the magnitude and phase of the output voltage of the variable voltage source is adjusted by an electronic means to automatically balance the bridge circuit.

---

This invention relates to an apparatus for detecting flaws in metallic materials with eddy current, and more particularly to an apparatus capable of automatically balancing bridge circuits used in such apparatus.

Eddy current flaw detectors have been used commercially to detect flaws or defects in tubes, rods, wires or other metallic materials. Ordinarily, a bridge circuit including four arms is used. Two detecting coils are connected to form two arms of the bridge and the material to be tested is passed therebetween. When energized by an alternating current (ordinary about 1 to 100 kc.), these detecting coils induce eddy currents that circulate through the section of the material being tested. Should the material contain any defect, the state of the eddy currents would be disturbed to thus vary the impedance of the detecting coils, thereby varying the amplitude of the alternating current. The amplitude variation is amplified and detected, and a voltage representing a defect of the material is produced, which may be recorded on a recording paper. Generally the bridge is balanced such that it indicates a zero-point in the absence of any defect. To this end the bridge may be balanced by operating a potentiometer by hand or with a servo-motor.

Such a method of balancing (or zero point adjustment) of the bridge circuit, however, may cause erroneous readings due to variations of starting operation, due to changes for the worse of material quality, and due to changes of the speed of passage of the material between the coils. Unfortunately, no satisfactory approach has been devised which can automatically and reliably overcome these disadvantages.

An object of this invention is to provide electronic means for automatically balancing a bridge circuit utilized for flaw detection whereby to completely eliminate errors caused by manual adjustment of the zero point and by the time delays and error introduced by the adjustment of the zero point by a servo-mechanism.

Another object of this invention is to precisely maintain the bridge in the balanced condition for flaw detecting signals having any phase, that is, whatever phase change in the signals is effected by the flaws (i.e., for any flaw detecting phase) without modification of the circuit.

A feature of this invention is that the electronic balancing device performs a phase discrimination to eliminate undesired components of signals. This phase discriminating function is provided by synchronous rectification of the output after amplification of the output to eliminate undesired signal components. This improves the sensitivity of defect detection under stabilized balanced conditions. Consequently, it becomes possible to readily analyze the frequency for respective phases (or signal components). Thus, in the case of detecting defects of materials having a definite (or limited) length, it is possible to reduce the axial length at the ends of the material in which defect detection is not possible.

SUMMARY OF THE INVENTION

In accordance with the present invention, apparatus for detecting flaws in metallic materials includes an A.C. bridge circuit including in an arm thereof an eddy current detecting coil which is arranged in proximity to a metallic material being tested. The bridge is energized by a source of an A.C. signal. The present invention provides a supplementary circuit for balancing the bridge against signal fluctuations other than those caused by detection of flaws in the material, the supplementary circuit comprising synchronous rectifier means coupled to the output of the bridge circuit and variable gain amplifier means coupling the A.C. signal source to the bridge circuit, the variable gain amplifier means having a gain control input which is coupled to the output of the synchronous rectifier means, the variable gain amplifier means supplying the bridge with a supplementary A.C. signal which is independent of, but synchronous with, and of the same frequency as, the output of the A.C. signal source to maintain the bridge in a balanced condition in the absence of flaws in the metallic material being tested.

Further objects and advantages of the present invention will become apparent and this invention will be better understood from the following description taken in conjunction with the accompanying drawing in which.

Figure 1:
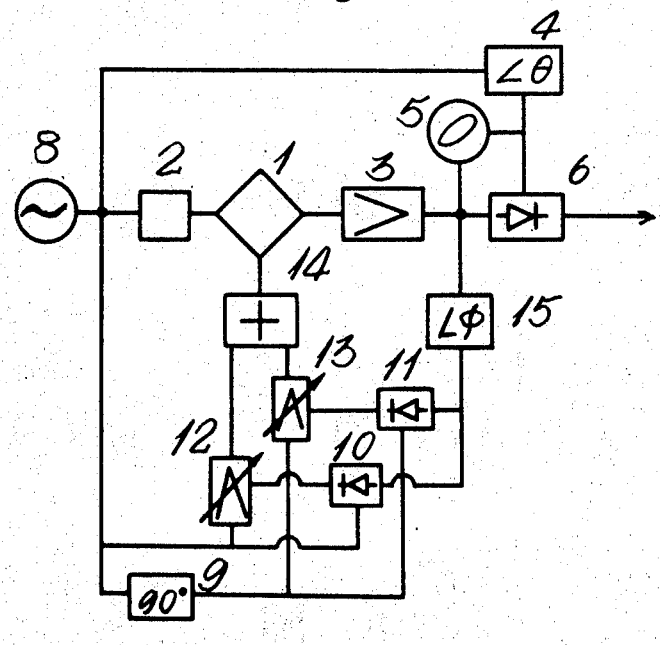
FIG. 1 is a basic block diagram of one embodiment of this invention wherein a variable voltage source is included in one branch of a bridge circuit.
Figure 3:
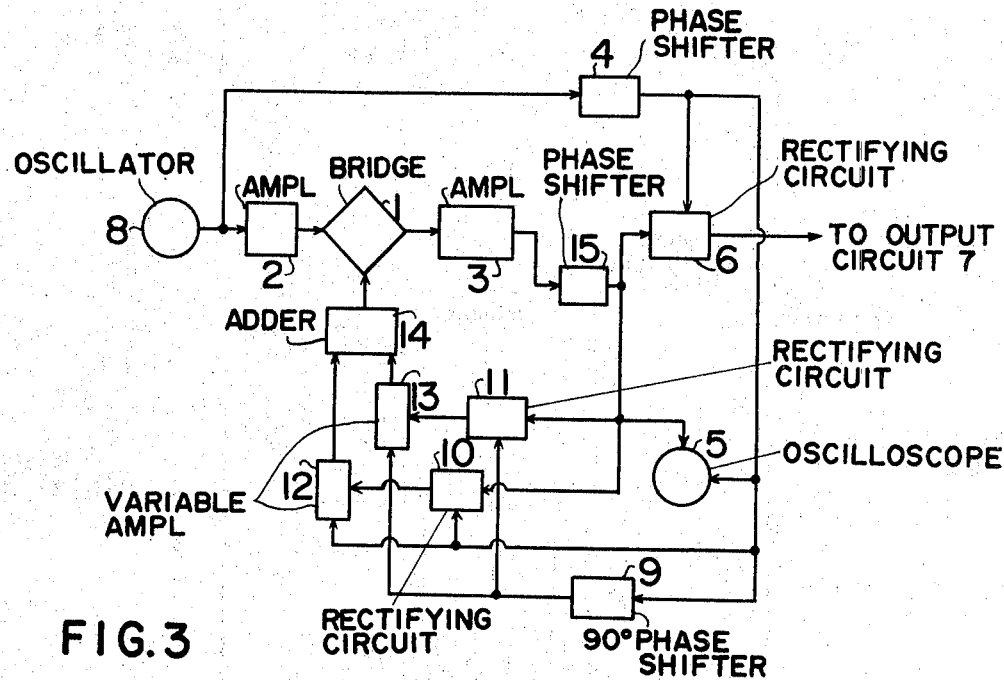
Figure 4:
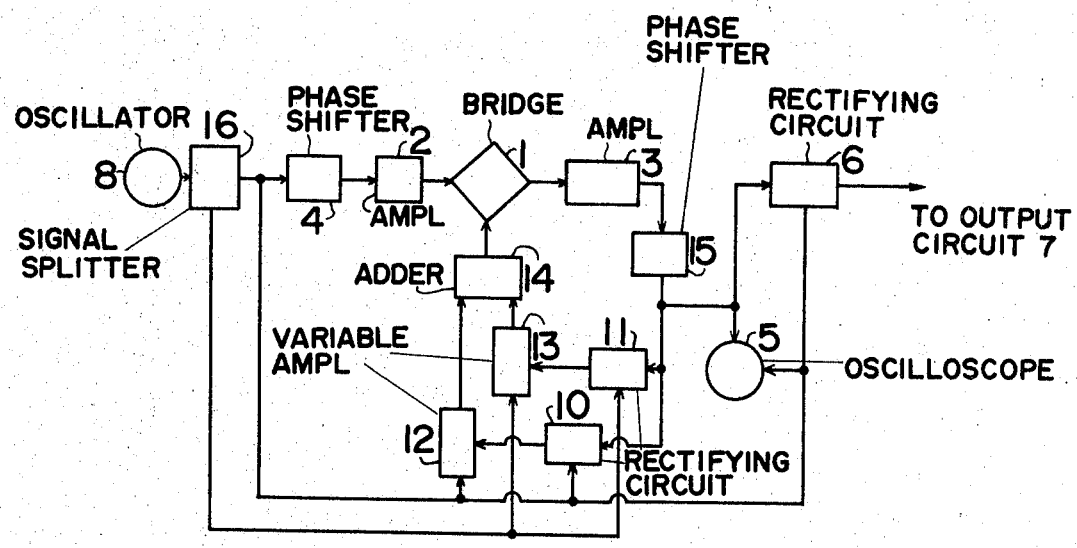

FIG. 3 is a block diagram of further modified embodiment of this invention wherein the phase difference between the unbalanced voltage and the applied flaw detecting phase voltage is always maintained constant when one component of the variable voltage source shown in FIG. 1 is varied; and FIG. 4 shows another embodiment of this invention wherein variation of the frequency of the source energizing the bridge circuit does not affect the operation thereof.

Generally, an A.C. bridge has two degrees of freedom, so that in order to maintain the bridge in the balanced condition two independent operations are required. A variable voltage source is equivalent to substituting a second A.C. source independent of the source for energizing the bridge for one of free arms of the bridge, that is the arms not including the detecting coils. The second A.C. source should have the same frequency as that of the source for energizing the bridge, and should be synchronous therewith. The purpose of utilizing the second A.C. voltage or the variable voltage source is to vectorially add outputs from two amplifiers of variable amplification degrees having mutually orthogonal input voltages and which are synchronized with the bridge energizing source. To detect the unbalanced voltage produced by the bridge circuit as two orthogonal components, two synchronous rectifying circuits having the applied voltages being orthogonal with each other are used. The outputs from these rectifiers are used to independently vary the amplification degree of said amplifiers to automatically balance the bridge circuit. By varying the time constant of the D.C. output circuit the response speeds can be readily set to independent values. If the response speed of automatic balancing were too fast defect detecting function would be impaired. However, in a phase discriminating type eddy current flaw detector utilizing synchronous rectifying circuits, elimination of the unbalance voltage component which is orthogonal to the applied voltage will not cause any trouble. In addition, rapid and positive balancing of such an unbalance voltage component is very effective and has a significant meaning. It is very easy to cause the applied voltage for flaw detection and the applied voltage for automatic balancing included in either one of the free arms (not including the detecting coil) to have the same phase. Accordingly, if said two applied voltages were made to have the same phase for any flaw detecting phase that is, for flaw detecting signals having any phase, the phase discriminating automatic balancing could be readily realized. This comprises one of the features of this invention.

Referring now to FIG. 1 of the accompanying drawing, a bridge circuit 1 has two arms including two respective detecting coils (not specifically shown) and is energized by a high frequency oscillator 8 through a power amplifier 2. The output of the bridge circuit 1 is supplied to a synchronous rectifying circuit 6 via an amplifier 3. The output of the high frequency oscillator 8 is also supplied to a synchronous rectifier circuit 6 and to a cathode ray oscilloscope 5 through a phase shifter 4. The rectifier circuit 6 provides an output to an output circuit 7 (not shown). The output of circuit 6 is proportional to the cosine of the phase difference between the two inputs thereto. The above described synchronous rectifier circuit 6 is well known in the art. The output of amplifier 3 is also fed to the oscilloscope 5 together with the signal from phase shifter 4 to provide a visual display of the phase difference.

According to this invention, in order to eliminate the various difficulties of the prior bridge circuits, that is, to automatically stabilize the operation of the circuit, circuit components 9 through 15 are added. More particularly, a 90° phase shifter 9, a synchronous rectifying circuit 11 identical with the rectifying circuit 6, amplifiers 12 and 13 of variable amplification, an addition circuit 14 and a phase shifter 15 are added. The addition circuit 14 is connected to a free arm of the bridge circuit. A free arm of the bridge is one which does not contain a sensing coil. Amplifiers 12 and 13 function as a second source for the bridge wherein the magnitude of two orthogonal signal components synchronized with the voltage supplied by the bridge energizing circuit 8 and 2 are independently adjusted. The outputs from the amplifiers 12 and 13 are vectorially added by addition circuit 14 and the sum is supplied to the bridge. It is advantageous to make the voltage supplied to the bridge by the addition circuit 14 as small as possible. The unbalanced voltage of the bridge due to various reasons mentioned above is amplified by the narrow-band amplifier 3 is passed through phase shifter 15 and is then divided into two orthogonal components by rectifiers 10 and 11, the outputs of which are supplied to variable amplification amplifiers 12 and 13, respectively.

Figure 2:
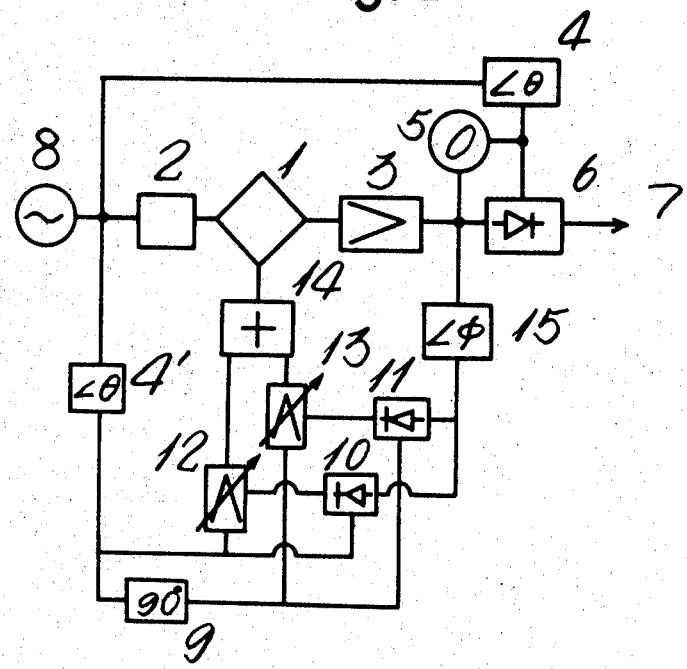
FIG. 2 is a block diagram of a modified embodiment of this invention.

FIG. 2 shows a modification of this invention wherein the phase difference between the two inputs to synchronous rectifier 10 is maintained equal to that between the inputs to rectifier 6. The connection of the circuit shown in FIG. 2 is substantially identical to that shown in FIG. 1 except that a second phase shifter 4' is connected between the oscillator 8 and the first phase shifter 9. This arrangement makes it possible to make the phase difference between the two inputs to the synchronous rectifier 10 equal to that between two inputs to the rectifier 6 by the adjustment of the phase shifter 4'. In this circuit, the sensitivity to the detection of flaws can be maintained by increasing constant of the circuit including the rectifier 10 and the amplifier 12 to limit the response speed of the correction signal applied to the bridge. The response speed is increased by reducing the time constant of the circuit including the rectifier 11 and the amplifier 13. With this circuit it is easy to balance the bridge against errors and to adjust the sensitivity.

FIG. 3 illustrates another modification of the basic arrangement shown in FIG. 1. The relationship between the automatic balancing coordinate phase and the flaw detecting phase of the circuit shown in FIG. 3 is identical to that shown in FIG. 2 and the phase differences between two inputs respectively to synchronous rectifiers 6 and 10 are equal. The circuit shown in FIG. 3 is different from that shown in FIG. 2 in that the 90° phase shifter 9, the synchronous rectifier 10 and the variable amplification amplifier 12 are energized by the phase shifter 4 for flaw detection. With this arrangement, equal phase differences mentioned above can be readily provided. More specifically, even if one component of the variable source varies from the balanced condition, the phase difference between the unbalanced voltage and the applied voltage of the flaw detecting phase would be maintained at the initial value of 0° or 90° for any value of the flaw detecting phase, thus assuring extremely stable operation.

FIG. 4 shows still another embodiment of this invention which is not affected by a variation in the oscillation frequency, thus automatically maintaining the bridge circuit in a stable balanced condition. In this embodiment the phase shifter 4 is connected between the oscillator 8 and the bridge energizing circuit or amplifier 2. Also, instead of the 90° phase shifter 9 shown in the previous embodiments, a circuit 16 for generating two orthogonal signal components is coupled between the high frequency oscillator 8 and the phase shifter 4. With this arrangement, variations in the oscillation frequency do not affect the automatic self-balancing action of the circuit.

What is claimed is:

1. In apparatus for the detection of flaws in metallic materials by the measurement of fluctuations in eddy currents set up in the material, the apparatus comprising an A.C. bridge circuit including in an arm thereof an eddy current detecting coil adapted to be arranged in proximity to said metallic material; and an A.C. signal source coupled to said bridge as a first input;

the improvement comprising:

a supplementary circuit for balancing said bridge against signal fluctuations other than those caused by detection of flaws in said metallic material, said supplementary circuit comprising:

synchronous rectifier means having inputs coupled to the output of said bridge circuit and to said A.C. signal source; and variable gain amplifier means coupled between said A.C. signal source and said bridge circuit to couple a second input to said bridge circuit, said variable gain amplifier means having a gain control input which is coupled to the output of said synchronous rectifier means, said variable gain amplifier means supplying said bridge with a supplementary A.C. signal which is independent of, but synchronous with, and of the same frequency as, the output of said A.C. signal source, to maintain said bridge in a balanced condition in the absence of flaws in the metallic material being tested.

2. Apparatus according to claim 1 wherein:

said variable gain amplifier means comprises first and second variable gain amplifiers, the inputs of each being coupled to said A.C. source, the outputs of each being coupled to said bridge circuit and each of which has a gain control input; and said synchronous rectifier means includes first and second synchronous rectifier circuits coupled to the output of said bridge circuit, the outputs of said first and second synchronous rectifier circuits being coupled respectively to the gain control inputs of said first and second variable gain amplifiers.

3. Apparatus according to claim 2 wherein said supplementary circuit further comprises:

a first phase shifting means coupled between said A.C.

source and said first variable gain amplifier to maintain the signals fed to said variable gain amplifiers substantially in phase quadrature;

a second phase shifting means coupled between the output of said bridge circuit and the inputs to both of said synchronous rectifier circuits; and adding means coupling the outputs of said variable gain amplifiers to said bridge circuit, said adding means vectorily adding the outputs of said variable gain amplifiers.

4. Apparatus according to claim 3 further comprising a third phase shifting means coupled between an output of said A.C. source and an output of said bridge circuit.

5. Apparatus according to claim 4 further comprising indicating means, including a phase comparing means, coupled to the output of said third phase shifting means and to the output of said bridge circuit for phase comparing the bridge output and the output of said third phase shifting means for indicating an unbalanced condition of the bridge circuit.

6. Apparatus according to claim 2 further comprising:

a signal splitter coupled to said A.C. source for generating first and second signal components in relative phase quadrature;

a first phase shifting means coupling said first signal component to an input of said bridge as said first input;

said signal splitter coupling said A.C. source to said variable gain amplifier means and said synchronous rectifier means;

a second phase shifting means coupling the output of said bridge circuit to said first and second synchronous rectifier circuits; and vector adding means summing the output signals received from said first and second variable gain amplifiers and feeding the result to said bridge circuit as said supplementary supply for effecting self-balancing of the bridge so that the bridge remains self-balanced during variations in frequency of the signal supplied by the A.C. source.

References Cited
UNITED STATES PATENTS 3,278,839   10/1966   Wells et al. _____ 324—40

RUDOLPH V. ROLINEC, Primary Examiner

R. J. CORCORAN, Assistant Examiner